United States Patent
Lin et al.

(10) Patent No.: US 9,716,930 B1
(45) Date of Patent: Jul. 25, 2017

(54) WIRELESS SPEAKER SYSTEM

(71) Applicant: Airoha Technology Corp., Hsinchu (TW)

(72) Inventors: Heng-Chih Lin, Hsinchu (TW); Wen-Sheng Hou, Taoyuan (TW); Chien-Chen Lin, Hsinchu County (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 15/182,643

(22) Filed: Jun. 15, 2016

Related U.S. Application Data

(60) Provisional application No. 62/275,289, filed on Jan. 6, 2016.

(30) Foreign Application Priority Data

Mar. 23, 2016 (TW) .............................. 105109053 A

(51) Int. Cl.
H04B 5/00 (2006.01)
H04R 1/02 (2006.01)
(Continued)

(52) U.S. Cl.
CPC ......... H04R 1/026 (2013.01); F21V 33/0056 (2013.01); G05D 1/12 (2013.01);
(Continued)

(58) Field of Classification Search
CPC ..... F21V 33/0056; G05D 1/12; H04L 67/125; H04L 67/18; H04R 1/026; H04R 2420/07;
(Continued)

(56) References Cited

U.S. PATENT DOCUMENTS 8,857,754 B2 * 10/2014 Ferrari .................. B64D 1/22
244/110 R
9,589,448 B1 * 3/2017 Schneider ............ G08B 25/016
(Continued)

FOREIGN PATENT DOCUMENTS

AE   WO 2014106814 A2 *  7/2014  ............. H04N 5/222
CN   102469402 A   5/2012
(Continued)

OTHER PUBLICATIONS

TIPO Office Action dated May 12, 2017 in corresponding Taiwan application (No. 105109053).

Primary Examiner — Vivian Chin
Assistant Examiner — Friedrich H Fahnert
(74) Attorney, Agent, or Firm — McClure, Qualey & Rodack, LLP

(57) ABSTRACT

A wireless speaker system including one or more self-propelled speaker device is provided. The self-propelled speaker device includes a processing unit, a wireless audio transmitter/receiver unit, a speaker unit, a tracking unit, and an actuator. The wireless audio transmitter/receiver unit is coupled to the processing unit and configured to receive an audio signal via a wireless transmission interface. The speaker unit is coupled to the processing unit and configured to produce sound according to the audio signal. The tracking unit is coupled to the processing unit and configured to track a location of a mobile device. The actuator is coupled to the processing unit. The processing unit controls the actuator according to the location of the mobile device. The actuator drives the self-propelled speaker device to move along with the mobile device.

14 Claims, 9 Drawing Sheets

(51) Int. Cl.
*H04W 4/00* (2009.01)
*H04L 29/08* (2006.01)
*F21V 33/00* (2006.01)
*G05D 1/12* (2006.01)
*H04W 84/12* (2009.01)

(52) U.S. Cl.
CPC ............ *H04L 67/125* (2013.01); *H04L 67/18* (2013.01); *H04W 4/008* (2013.01); *H04R 2420/07* (2013.01); *H04R 2499/13* (2013.01); *H04W 84/12* (2013.01)

(58) Field of Classification Search
CPC ... H04R 2499/13; H04W 84/12; H04W 4/008
USPC ........ 381/77, 79, 145; 340/4.11, 12.22, 657, 340/815.6, 930; 901/6, 36, 38, 46
See application file for complete search history.

(56) References Cited

U.S. PATENT DOCUMENTS

| | | | | |
|---|---|---|---|---|
| 2006/0047364 | A1* | 3/2006 | Tani | A47L 9/009 700/245 |
| 2015/0301150 | A1* | 10/2015 | Stuckman | G01S 1/00 342/407 |
| 2016/0340006 | A1* | 11/2016 | Tang | B63C 9/01 |
| 2016/0351089 | A1* | 12/2016 | Salem | G09F 21/12 |
| 2016/0376031 | A1* | 12/2016 | Michalski | B64F 1/36 701/15 |

FOREIGN PATENT DOCUMENTS

| | | |
|---|---|---|
| EP | 2884764 A1 | 6/2015 |
| TW | M495688 U | 2/2015 |

* cited by examiner

WIRELESS SPEAKER SYSTEM

CROSS-REFERENCE TO RELATED APPLICATION

This application claims the benefits of U.S. provisional application Ser. No. 62/275,289, filed on Jan. 6, 2016, and Taiwan application Serial No. 105109053, filed on Mar. 23, 2016, the subject matters of which are incorporated herein by reference.

TECHNICAL FIELD

The disclosure relates to a wireless speaker system, and more particularly, to a wireless speaker system including a self-propelled speaker device.

BACKGROUND

Multimedia players, such as a speaker device capable of playing music, have become very popular entertainment equipment in our lives. However, transmitting audio signals through audio signal lines may make it difficult to setup or move the speaker devices. As the progress of wireless transmission technology, wireless signal transmission has been applied to speaker devices. Thus, there is a need for designing a wireless speaker system that is easy to use.

SUMMARY

The disclosure relates to a wireless speaker system, including a self-propelled device that is able to move along with a user.

According to one embodiment, a wireless speaker system including one or more self-propelled speaker device is provided. The self-propelled speaker device includes a processing unit, a wireless audio transmitter/receiver unit, a speaker unit, a tracking unit, and an actuator. The wireless audio transmitter/receiver unit is coupled to the processing unit and configured to receive an audio signal via a wireless transmission interface. The speaker unit is coupled to the processing unit and configured to produce sound according to the audio signal. The tracking unit is coupled to the processing unit and configured to track a location of a mobile device. The actuator is coupled to the processing unit. The processing unit controls the actuator according to the location of the mobile device. The actuator drives the self-propelled speaker device to move along with the mobile device.

Figure 1:
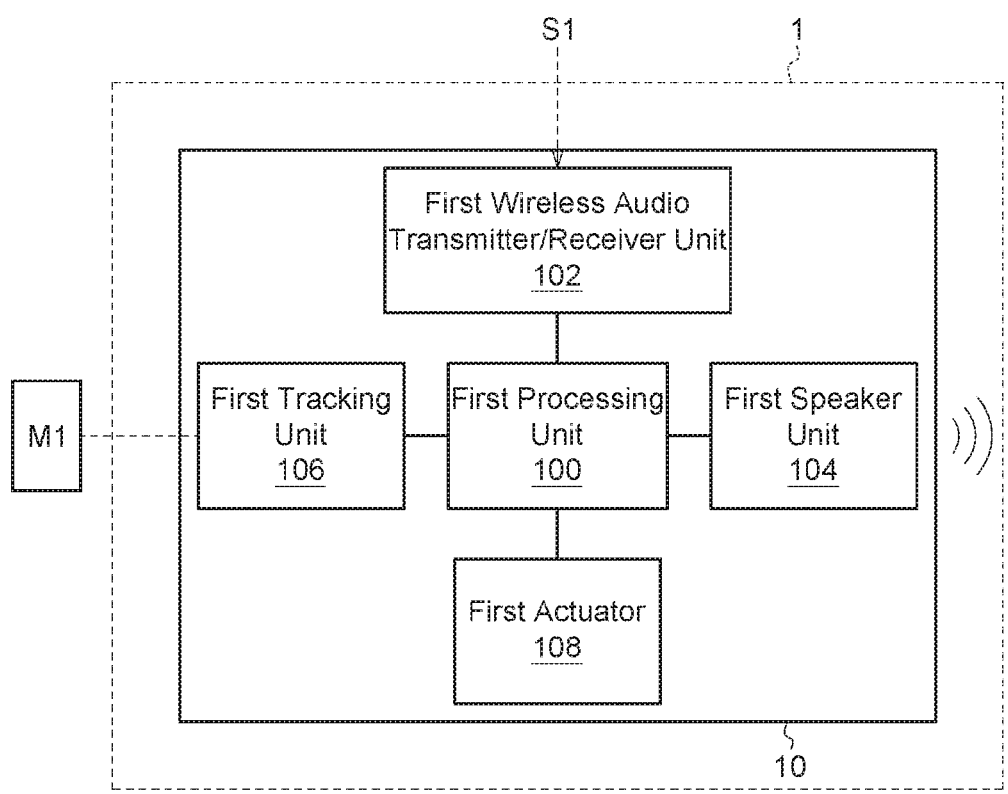
FIG. 1 shows a diagram illustrating a wireless speaker system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram illustrating a wireless speaker system according to an embodiment of the disclosure. The wireless speaker system 1 may include one or more self-propelled speaker devices. In this embodiment, one first self-propelled speaker device 10 is included. The first self-propelled speaker device 10 includes a first processing unit 100, a first wireless audio transmitter/receiver unit 102, a first speaker unit 104, a first tracking unit 106, and a first actuator 108. The first wireless audio transmitter/receiver unit 102 is coupled to the first processing unit 100 and configured to receive a first audio signal S1 via a wireless transmission interface. The first speaker unit 104 is coupled to the first processing unit 100 and configured to produce sound according to the first audio signal S1. The first tracking unit 106 is coupled to the first processing unit 100 and configured to track a location of a mobile device M1. The first actuator 108 is coupled to the first processing unit 100. The first processing unit 100 controls the first actuator 108 according to the location of the mobile device M1. The first actuator 108 drives the first self-propelled speaker device 10 to move along with the mobile device M1.

The first processing unit 100 may be a microcontroller, a central processing unit (CPU), or a digital logic circuit. The first processing unit 100 acts as a core control unit of the first self-propelled speaker device 10 to control operations of other units. For example, the first processing unit 100 may include a processor and a memory. The control related to operations of the first self-propelled speaker device 10 may be accomplished by programs that are stored in the memory. The processor may load the program from the memory to perform related control operations.

The first wireless audio transmitter/receiver unit 102 receives the first audio signal S1 via the wireless transmission interface. There may be several implementations for the wireless transmission interface, including Bluetooth, wireless local area network (such as Wi-Fi), Near Field Communication (NFC), and other wireless transmission technologies. The first audio signal S1 may refer to an encoded signal after encoding the original audio signal, and the encoded signal may be transmitted via the wireless transmission interface. Therefore the frequency range of the first audio signal S1 is not restricted by the frequency limits of human hearing. Taking Bluetooth communication as an example, the communication protocol adopted may be Bluetooth 4.0, the first wireless audio transmitter/receiver unit 102 may be a Bluetooth transceiver including a Bluetooth antenna, and the first audio signal S1 may be an encoded signal that conforms to Bluetooth protocol, such as being encode by sub-band coding (SBC) or advanced audio coding (AAC). In addition to receiving an audio signal, the first wireless audio transmitter/receiver unit 102 may also transmit an audio signal via the wireless interface to other devices.

The first processing unit 100 may decode the encoded first audio signal S1, and transmit the decoded signal to the first speaker unit 104. The first speaker unit 104 converts the electrical signal received from the first processing unit 100 to a sound to be played. The first speaker unit 104 may include a digital to analog converter (DAC) and a power amplifier.

The first wireless audio transmitter/receiver unit 102 may receive the first audio signal S1 from an electronic device that supports Bluetooth protocol. In one embodiment, the first wireless audio transmitter/receiver unit 102 receives the first audio signal S1 from a mobile device M1 that supports Bluetooth protocol. The mobile device M1 may be a cellphone, a tablet computer, a laptop computer, or a wearable device. For example, a user may operate a cellphone to select a song such that the song may be played by the first self-propelled speaker device 10.

The first actuator 108 provides moving power for the first self-propelled speaker device 10. The first actuator 108 receives control signal from the first processing unit 100 and converts the electrical signal to produce mechanical kinetic energy and drives the first self-propelled speaker device 10 to move correspondingly. There may be several implementations for the first actuator 108 to provide various sources of moving power for the first self-propelled speaker device 10. Depending on the moving region and environment of the first self-propelled speaker device 10, the first actuator 108 includes at least one of the following: a motor, a wheel, a continuous track, a propeller, and a paddle wheel.

Figure 2A:
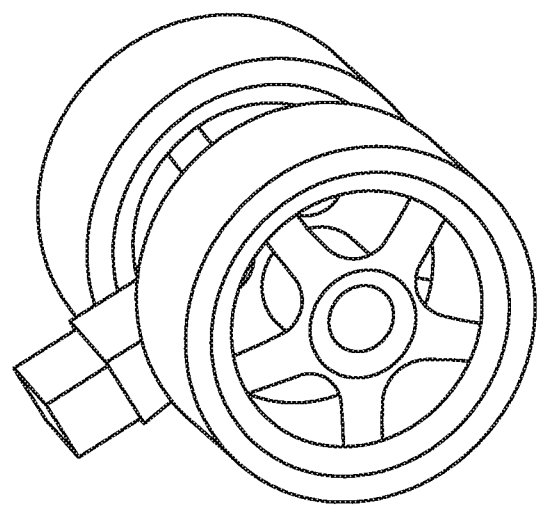
FIGS. 2A-2D show diagrams of actuators according to various embodiments of the disclosure.

FIGS. 2A-2D show diagrams of actuators according to various embodiments of the disclosure. FIG. 2A shows a motor and wheels, wherein the motor drives the wheels to rotate. For example, the first self-propelled speaker device 10 includes a casing. The first processing unit 100, the first wireless audio transmitter/receiver unit 102, the first speaker unit 104, and the first tracking unit 106 may be disposed interior to the casing. The shape of the casing may be cubic or spherical, which is not limited thereto. Taking a cubic casing for example, wheels may be disposed exterior to the casing, such that the first self-propelled speaker device 10 may move on the ground, such as moving forward, backward, and making turns. In another embodiment, the first self-propelled speaker device 10 may include a spherical casing. Wheels may be disposed interior to the casing. Wheels rotate to provide driving force for the spherical casing to roll on the ground, with the rolling speed and direction controlled by the motor and wheels.

Figure 2B:
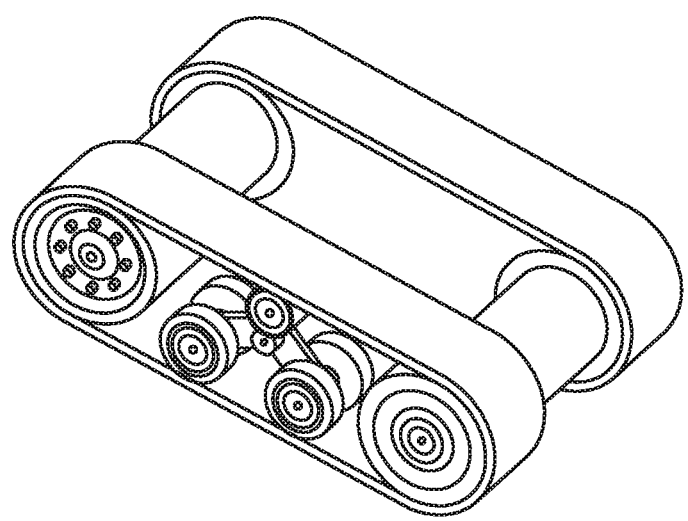
Figure 2C:
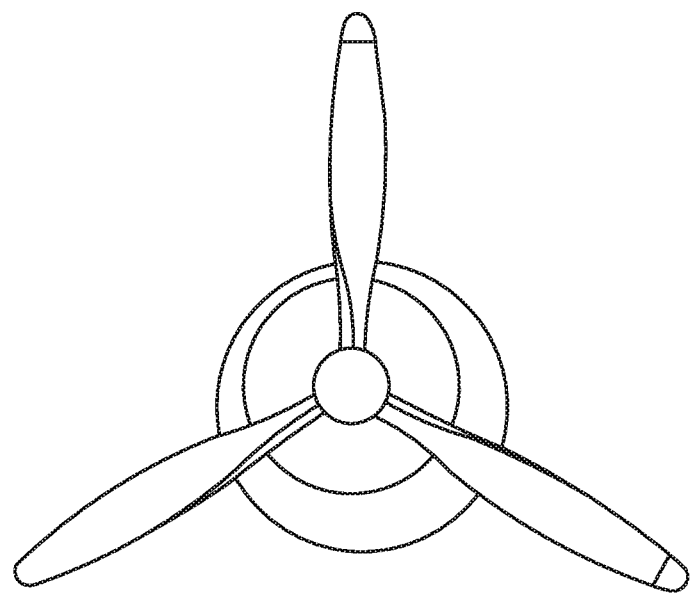
Figure 2D:
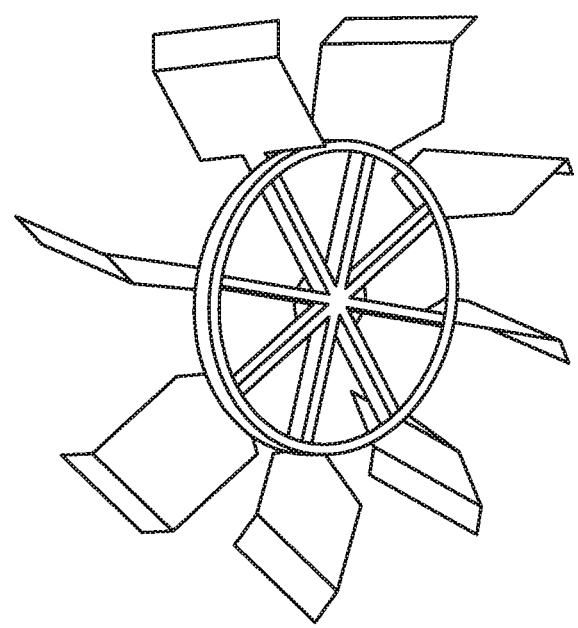

FIG. 2B shows continuous tracks and wheels. Continuous tracks are good at overcoming obstacles on the ground, such as messy items or bumpiness on the ground. FIG. 2C shows a propeller, which may be disposed exterior to the casing and driven by a motor. The propeller may provide flying power to the first self-propelled speaker device 10 to control the flying speed and direction in the air. FIG. 2D shows a paddle wheel, which may be disposed exterior to the casing. The casing may be made of waterproof materials. The paddle wheel may provide navigation power to the first self-propelled speaker device 10 in water when driven by a motor to control the navigation speed and direction. Various implementation embodiments regarding the first actuator 108 are shown in FIGS. 2A-2D. The first actuator 108 may also include multiple elements shown in FIGS. 2A-2D, such that the first self-propelled speaker device 10 may move on the ground, in the air, and in the water.

The first tracking unit 106 is configured to track a location of the mobile device M1. The first tracking unit 106 and the mobile device M1 may communicate via wireless signal transmission, such that the first tracking unit 106 obtains the location of the mobile device M1. For example, the first tracking unit 106 and the mobile device M1 may use indoor positioning technologies, including Wi-Fi (such as Wi-Fi triangulation, Wi-Fi fingerprinting), Bluetooth (such as iBeacon), Zigbee, infrared, radio frequency identification (RFID), etc. Taking Bluetooth for example, the mobile device M1 may act as a Beacon to broadcast signal continuously. The first tracking unit 106 receives signal via a Bluetooth transmission interface to obtain the location information of the mobile device M1.

The first tracking unit 106 may transmit the location information of the mobile device M1 to the first processing unit 100. The first processing unit 100 controls the first actuator 108 according to the location of the mobile device M1. For example, the first processing unit 100 may calculate the required acceleration vector (including direction and magnitude) in order to follow the mobile device M1. The first actuator 108 drives the first self-propelled speaker device 10 to move according to the control signal from the first processing unit 100.

The first processing unit 100, the first wireless audio transmitter/receiver unit 102, the first speaker unit 104, the first tracking unit 106, and the first actuator 108 may be implemented by hardware circuits. These units are depicted as separate modules in FIG. 1 for purpose of clear illustration and better understanding. In practice, several units may be integrated in a single circuit. For example, the first wireless audio transmitter/receiver unit 102 and the first tracking unit 106 both use Bluetooth transmission, and hence these two units may be integrated in a single Bluetooth chip.

Because the wireless speaker system described in the previous embodiments includes a self-propelled speaker device, which is able to move and play music, the wireless speaker system can provide users high level of entertainment. The self-propelled speaker device may move on the ground, in the air, or in the water, making it very convenient in practical use. In addition, because the self-propelled speaker device includes a tracking unit, when a user carries a mobile device, such as a cellphone, a wearable device, or a positioning tag, the tracking unit is able to recognize the location of this mobile device, such that the self-propelled speaker device can move along with the user. Therefore, no matter where the user goes, the self-propelled speaker device can automatically follow the user and play music at the same time, offering an excellent user experience.

Figure 3:
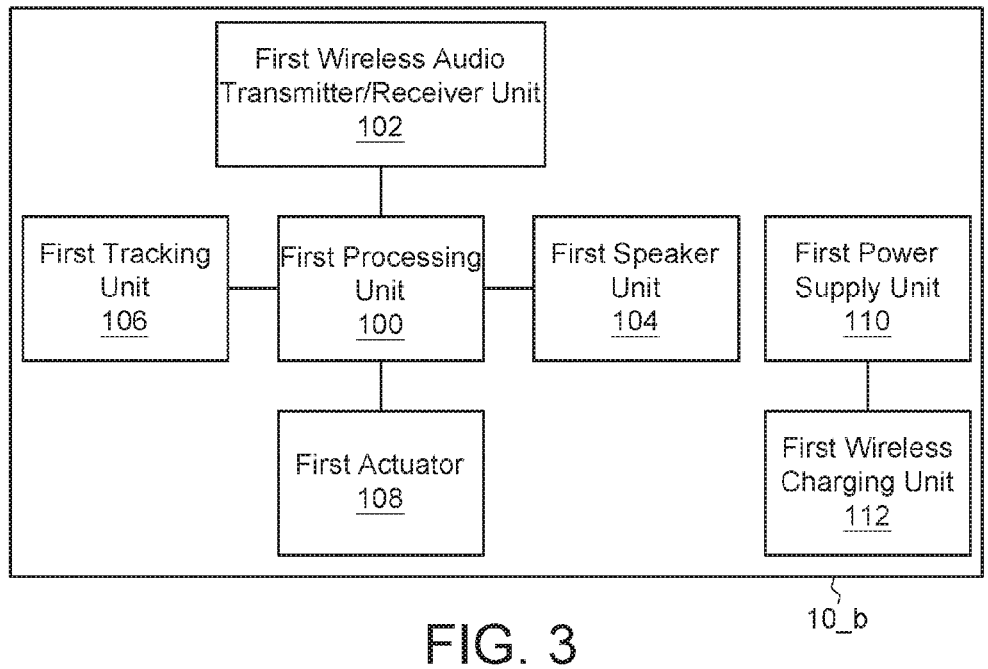
FIG. 3 shows a diagram illustrating a self-propelled speaker device according to an embodiment of the disclosure.

FIG. 3 shows a diagram illustrating a self-propelled speaker device according to an embodiment of the disclosure. In this embodiment, the first self-propelled speaker device 10_b further includes a first power supply unit 110 and a first wireless charging unit 112. The first power supply unit 110 is configured to supply power to the first self-propelled speaker device 10_b. The first wireless charging unit 112 is coupled to the first power supply unit 110, and is inductively coupled to an external charger to charge the first power supply unit 110. For example, the first power supply unit 110 may be a rechargeable battery. The rechargeable battery may be disposed inside the casing of the first self-propelled speaker device 10_b. Thus the first self-propelled speaker device 10_b does not need to be connected to the mains electricity through wires, making the first self-propelled speaker device 10_b able to move freely. The voltage outputted from this rechargeable battery may also provide power to other units in the first self-propelled speaker device 10_b. The connection related to power supply is not illustrated in the figure to simplify the drawing. In practice, the first power supply unit 110 may be coupled to other units to provide power. The first wireless charging unit 112 may include coils, which is inductively coupled to an external charger, to receive an alternating electromagnetic field via electromagnetic induction to charge the first power supply unit 110. Because the first self-propelled speaker device 10_b includes the first wireless charging unit 112, usage convenience is greatly enhanced with the wireless charging capability. The user may charge the first self-propelled speaker device 10_b by putting it on a charging base.

Figure 4:
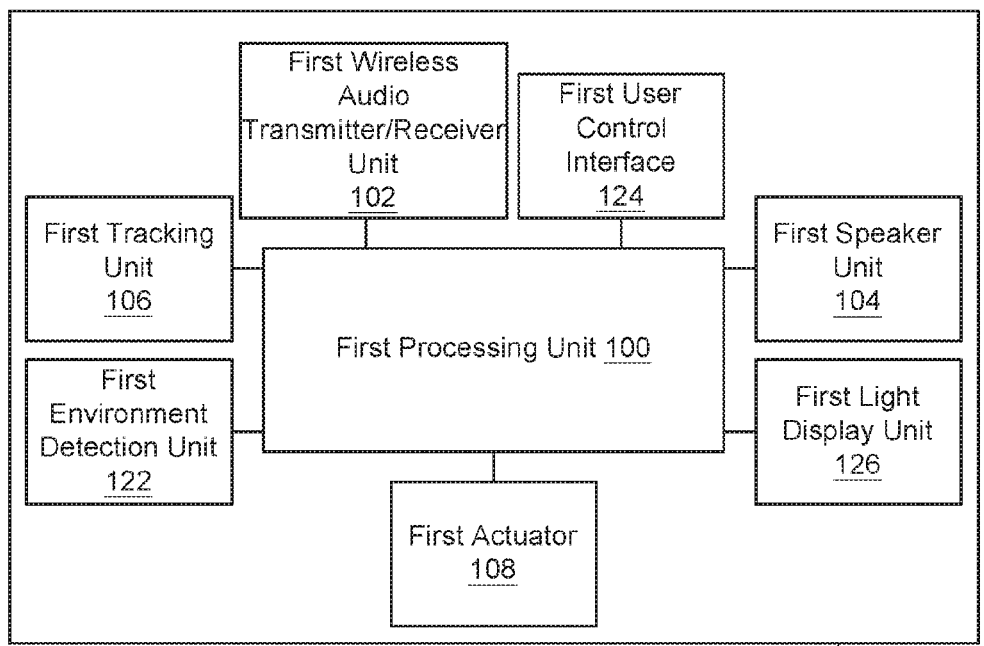
FIG. 4 shows a diagram illustrating a self-propelled speaker device according to an embodiment of the disclosure.

FIG. 4 shows a diagram illustrating a self-propelled speaker device according to an embodiment of the disclosure. In this embodiment, the first self-propelled speaker device 10_c further includes a first environment detection unit 122, a user control interface 124, and a light display unit 126. These three units may be optionally disposed. In one embodiment, the first self-propelled speaker device 10_c may include only one or two of these three units. Three units are depicted in FIG. 4 to illustrate a possible implementation, rather than limiting the present invention.

The first environment detection unit 122 is coupled to the first processing unit 100 and configured to detect a geographical environment surrounding the first self-propelled speaker device 10_c. The first processing unit 100 controls the first actuator 108 according to the geographical environment surrounding the first self-propelled speaker device 10_c. The first environment detection unit 122 may include camera lens and/or proximity sensors. The camera lens may capture images of the surroundings to identify if there are obstacles or walls nearby, such that the first processing unit 100 is able to decide when to detour or make turns. The proximity sensors may detect the distance between the first self-propelled speaker device 10_c and the near objects, such that the first self-propelled speaker device 10 can avoid bumping into obstacles in the surrounding environment.

The first user control interface 124 is coupled to the first processing unit 100 and is configured to receive a control command. The first processing unit 100 controls the first actuator 108 according to the control command, and the first actuator 108 drives the first self-propelled speaker device 10_c to move according to the control command. In one embodiment, the first self-propelled speaker device 10_c has two operation modes, including auto and manual modes. In the auto mode, the first self-propelled speaker device 10_c may move along with the mobile device M1 according to the signals generated by the first tracking unit 106. In the manual mode, the user may instruct the first self-propelled speaker device 10 how to move. For example, the user may install a corresponding application program on the cellphone and give command via the application program on the cellphone. Therefore, the user may remotely control how the first self-propelled speaker device 10_c moves. As such, the first self-propelled speaker device 10_c may move to specific locations in response to the user's request.

The first light display unit 126, including a lighting device, is coupled to the first processing unit 100. The first processing unit 100 may be configured to analyze the first audio signal S1 to obtain first audio characteristic data. The first light display unit 126 is configured to adjust color and/or light intensity of the lighting device according to the first audio characteristic data. The lighting device may include multiple light emitting diodes (LED). The first processing unit 100 may include an audio analysis unit (either a software unit or a hardware unit) to analyze the first audio signal S1 to obtain first audio characteristic data. For example, the signal in time domain may be analyzed to generate a corresponding spectrum. Depending on the frequency components of the first audio signal S1, the first light display unit 126 may adjust the color of the lighting device. For example, red may be displayed when there are more high frequency components, while blue may be displayed when there are more low frequency components. In addition, depending on the magnitude on the spectrum of the first audio signal S1, the first light display unit 126 may adjust the light intensity of the lighting device. In this embodiment, the first self-propelled speaker device 10_c changes the lighting corresponding to the characteristics of the music, providing even richer entertaining effects.

Figure 5:
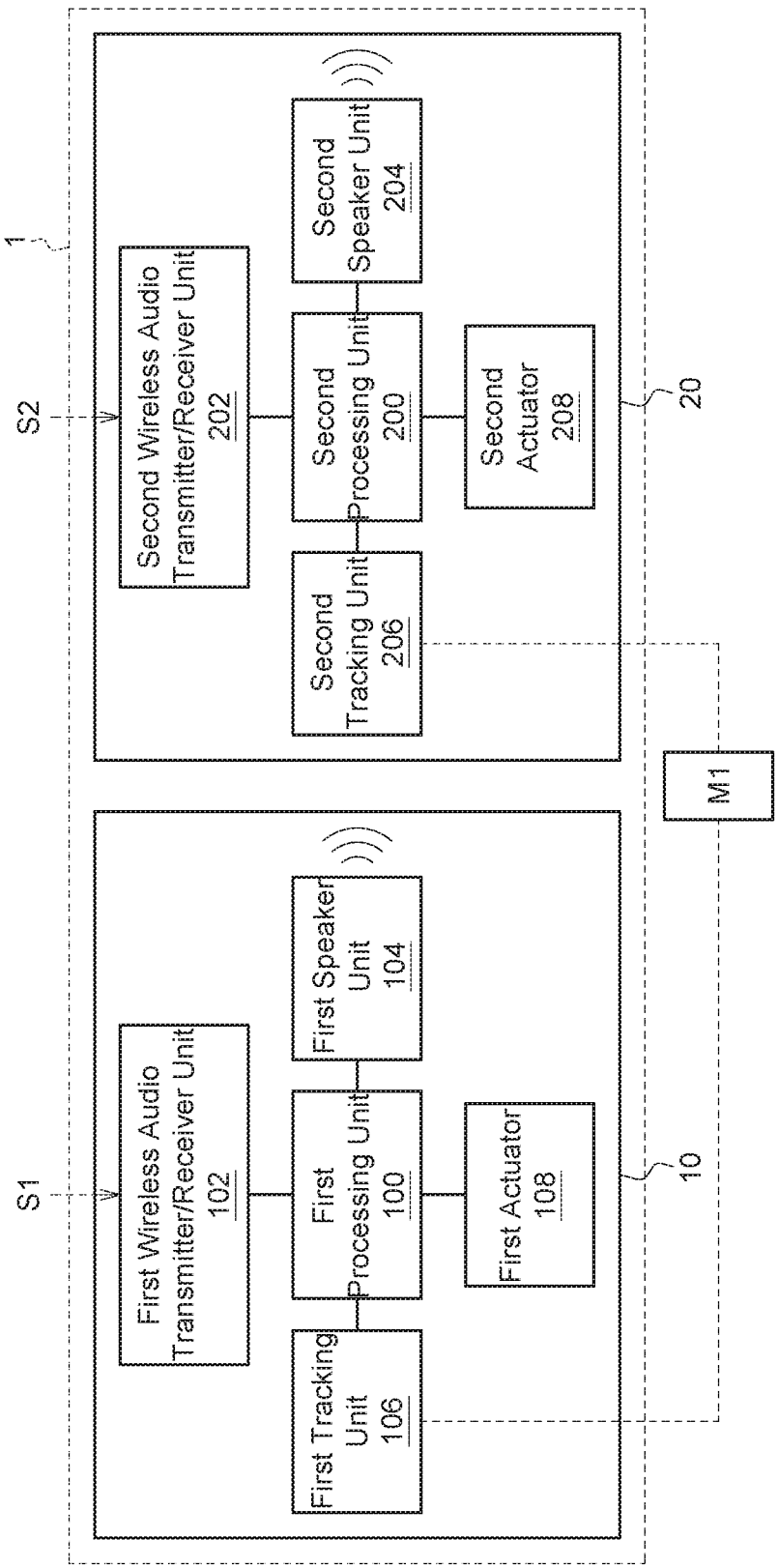
FIG. 5 shows a diagram illustrating a wireless speaker system according to an embodiment of the disclosure.

FIG. 5 shows a diagram illustrating a wireless speaker system according to an embodiment of the disclosure. As described above, the wireless speaker system may include one or more self-propelled speaker devices. In this embodiment, the wireless speaker system 1 includes a first self-propelled speaker device 10 and a second self-propelled speaker device 20. The second self-propelled speaker device 20 may be the same as or similar to the first self-propelled speaker device 10. The second self-propelled speaker device 20 includes a second processing unit 200, a second wireless audio transmitter/receiver unit 202, a second speaker unit 204, a second tracking unit 206, and a second actuator 208. The second wireless audio transmitter/receiver unit 202 may receive the second audio signal S2 via the wireless transmission interface (which may be the same as the wireless transmission interface used in the first self-propelled speaker device 10, such as using Bluetooth in both devices or using Wi-Fi in both devices). The second tracking unit 206 may also track the location of the mobile device M1. Operations of other units are similar to those in the first self-propelled speaker device 10 and thus are not repeater here.

In this embodiment, because the wireless speaker system 1 includes the first self-propelled speaker device 10 and the second self-propelled speaker device 20, the first speaker unit 104 may be a left channel speaker and the second speaker unit 204 may be a right channel speaker to produce a stereophonic sound. For example, the first audio signal S1 received by the first self-propelled speaker device 10 may come from the mobile device M1. After being processed by the first processing unit 100, the first audio signal S1 may be divided into a left channel audio signal and a right channel audio signal. The left channel audio signal may be played by the first speaker unit 104. The second audio signal S2 received by the second self-propelled speaker device 20 may come from the first self-propelled speaker device 10 and may be corresponding to the right channel audio signal. The first wireless audio transmitter/receiver unit 102 transmits the right channel audio signal to the second wireless audio transmitter/receiver unit 202, and the second speaker unit 204 plays the right channel audio signal.

The second tracking unit 206 may also track the location of the mobile device M1, and thus the second self-propelled speaker device 20 can move along with the mobile device M1 as well. In one embodiment, the first tracking unit 106 is further configured to track the location of the second self-propelled speaker device 20. The first processing unit 100 controls the first actuator 108 according to the location of the second self-propelled speaker device 20. The second tracking unit 206 is further configured to track the location of the first self-propelled speaker device 10. The second processing unit 200 controls the second actuator 208 according to the location of the first self-propelled speaker device 10.

For example, the first tracking unit 106 may be a wireless transceiver. In addition to receiving wireless signals transmitted from other devices, the first tracking unit 106 may also broadcast wireless signals, such that the second tracking unit 206 may identify the location of the first tracking unit 106. Similarly, the second tracking unit 206 may also be a wireless transceiver capable of transmitting and receiving wireless signals. As such, the first self-propelled speaker device 10 and the second self-propelled speaker device 20 know the location of each other and can automatically adjust the distance in-between accordingly. A better sound playing effect may be achieved because the distance between the first self-propelled speaker device 10 and the second self-propelled speaker device 20 can be kept in a reasonable range. Furthermore, the locations of these two self-propelled speaker devices may be adjusted according to the location of the mobile device M1. For example, the orientations of the first speaker unit 104 and the second speaker unit 204 may be adjusted automatically to make them both face the mobile device M1.

Figure 6A:
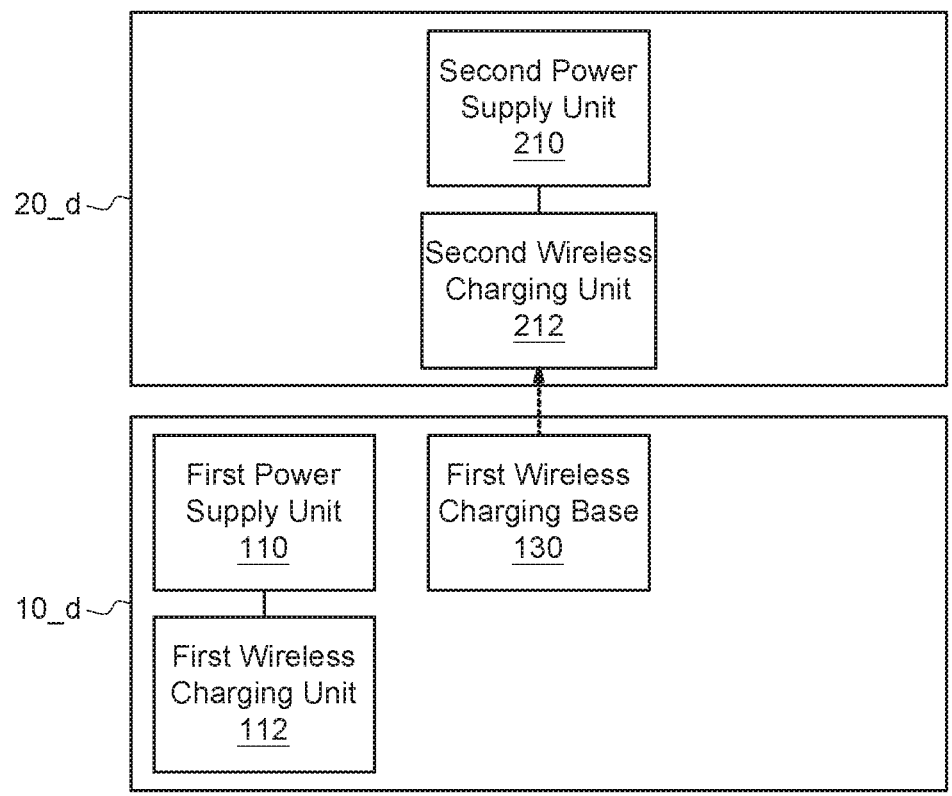
FIG. 6A shows a diagram illustrating integrated wireless charging of two self-propelled speaker devices according to an embodiment of the disclosure.

Similar to the first self-propelled speaker device 10_b shown in FIG. 3, in one embodiment, the second self-propelled speaker device 20 may also include a second power supply unit 210 and a second wireless charging unit 212. The two self-propelled speaker devices may be charged independently. Alternatively, in one embodiment, the two self-propelled speaker devices may be integrated when performing wireless charging. FIG. 6A shows a diagram illustrating integrated wireless charging of two self-propelled speaker devices according to an embodiment of the disclosure. For the first self-propelled speaker device 10_d and the second self-propelled speaker device 20_d, only the units related to wireless charging are illustrated in FIG. 6A, other units are omitted to simplify the drawing.

The first self-propelled speaker device 10_d includes the first power supply unit 110, the first wireless charging unit 112, and the first wireless charging base 130. The second self-propelled speaker device 20_d includes the second power supply unit 210 and the second wireless charging unit 212. The first wireless charging unit 112 is inductively coupled to an external charger to charge the first power supply unit 110. The second wireless charging unit 212 is inductively coupled to the first wireless charging base 130 to charge the second power supply unit 210. For example, the second wireless charging unit 212 may stick to the first wireless charging base 130 by the magnetic force. When performing wireless charging, the first self-propelled speaker device 10_d and the second self-propelled speaker device 20_d may be tied together. The external charger provides energy to the first wireless charging unit 112, and the first wireless charging base 130 provides energy to the second wireless charging unit 212, achieving the effect of integrated wireless charging.

Figure 6B:
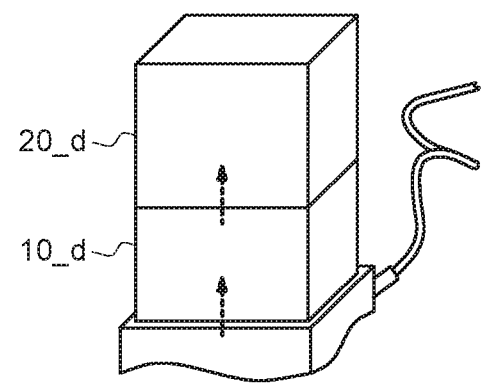
FIG. 6B shows a diagram illustrating an appearance of integrated wireless charging of two self-propelled speaker devices according to an embodiment of the disclosure.

FIG. 6B shows a diagram illustrating an appearance of integrated wireless charging of two self-propelled speaker devices according to an embodiment of the disclosure. Although a cubic casing is used in this embodiment, other shapes may also be applicable to the casing of the self-propelled speaker device. When performing wireless charging, the first self-propelled speaker device 10_d may be put above the external charger base, and the second self-propelled speaker device 20_d may be put above the first self-propelled speaker device 10_d. Only one external charger base is required for integrated wireless charging of two self-propelled speaker devices, hence improving the usage convenience.

Figure 7:
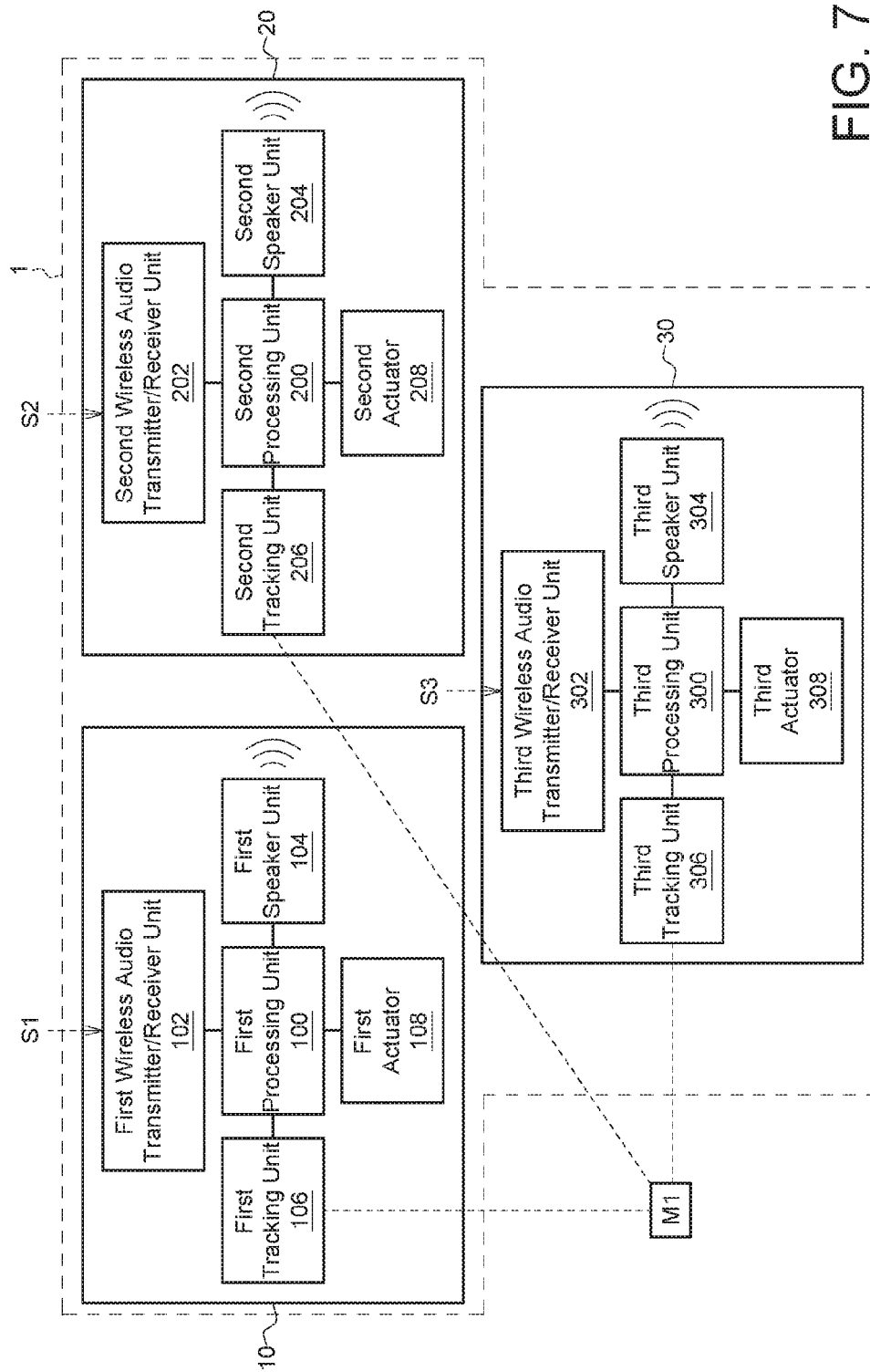
FIG. 7 shows a diagram illustrating a wireless speaker system according to an embodiment of the disclosure.

FIG. 7 shows a diagram illustrating a wireless speaker system according to an embodiment of the disclosure. In this embodiment, the wireless speaker system 1 includes the first self-propelled speaker device 10, the second self-propelled speaker device 20, and the third self-propelled speaker device 30. The third self-propelled speaker device 30 may be the same as or similar to the second self-propelled speaker device 20. The third self-propelled speaker device 30 includes a third processing unit 300, a third wireless audio transmitter/receiver unit 302, a third speaker unit 304, a third tracking unit 306, and a third actuator 308. The third wireless audio transmitter/receiver unit 302 may receive the third audio signal S3 via the wireless transmission interface (which may be the same as the wireless transmission interface used in the second self-propelled speaker device 20). The third tracking unit 306 may also track the location of the mobile device M1. Operations of other units are similar to those in the second self-propelled speaker device 20 and thus are not repeater here.

In one embodiment, the first speaker unit 104 may be a bass channel speaker (a woofer designed to produce low frequency sounds), the second speaker unit 204 may be a right channel speaker, and the third speaker unit 304 may be a left channel speaker to produce a stereophonic sound. Bass component of the sound can be enhanced in this embodiment. Because the base channel speaker may occupy larger space, the casing of the first self-propelled speaker device 10 may be larger than the casing of the second self-propelled speaker device 20 or the third the casing of the first self-propelled speaker device 30.

In one embodiment, the third wireless audio transmitter/receiver unit 302 may receive the third audio signal S3 from the mobile device M1. After being processed by the third processing unit 300, the third audio signal S3 may be divided into a left channel audio signal, a right channel audio signal, and a bass channel audio signal. The third speaker unit 304 may play the left channel audio signal. The first wireless audio transmitter/receiver unit 102 may receive the first audio signal S1 from the third self-propelled speaker device 30 (such as being transmitted by the third wireless audio transmitter/receiver unit 302). The first audio signal S1 may be corresponding to the bass channel audio signal. The second wireless audio transmitter/receiver unit 202 may also receive the second audio signal S2 from the third self-propelled speaker device 30 (such as being transmitted by the third wireless audio transmitter/receiver unit 302). The second audio signal S2 may be corresponding to the right channel audio signal. The signal transmission method disclosed herein is just exemplary rather than limiting. There may be other different implementation methods for signal transmission between these three self-propelled speaker devices.

Because the third tracking unit 306 may also track the location of the mobile device M1, the third self-propelled speaker device 30 may also move along with the mobile device M1. In one embodiment, the first self-propelled speaker device 10, the second self-propelled speaker device 20, and the third self-propelled speaker device 30 track the locations of each other by the first tracking unit 106, the second tracking unit 206, and the third tracking unit 306, respectively. The first processing unit 100, the second processing unit 200, and the third processing unit 300 may accordingly control the first actuator 108, the second actuator 208, and the third actuator 308, respectively. In other words, the first tracking unit 106, the second tracking unit 206, and the third tracking unit 306 know the locations of each other, and thus the three self-propelled speaker devices may be adjusted automatically according to, for example, the distances between these three self-propelled speaker devices to achieve the best surround sound effect. In addition, based on the location of the mobile device M1, the orientations of the first speaker unit 104, the second speaker unit 204, and the third speaker unit 304 may be adjusted automatically to make them all face the mobile device M1. Taking Bluetooth positioning for example, the first tracking unit 106, the second tracking unit 206, and the third tracking unit 306 may all receive the positioning signal from the mobile device M1, and these three tracking units may also communicate to each other. Accurate positioning effect may be achieved by an appropriate calculation based on locations of multiple points in the space.

Figure 8A:
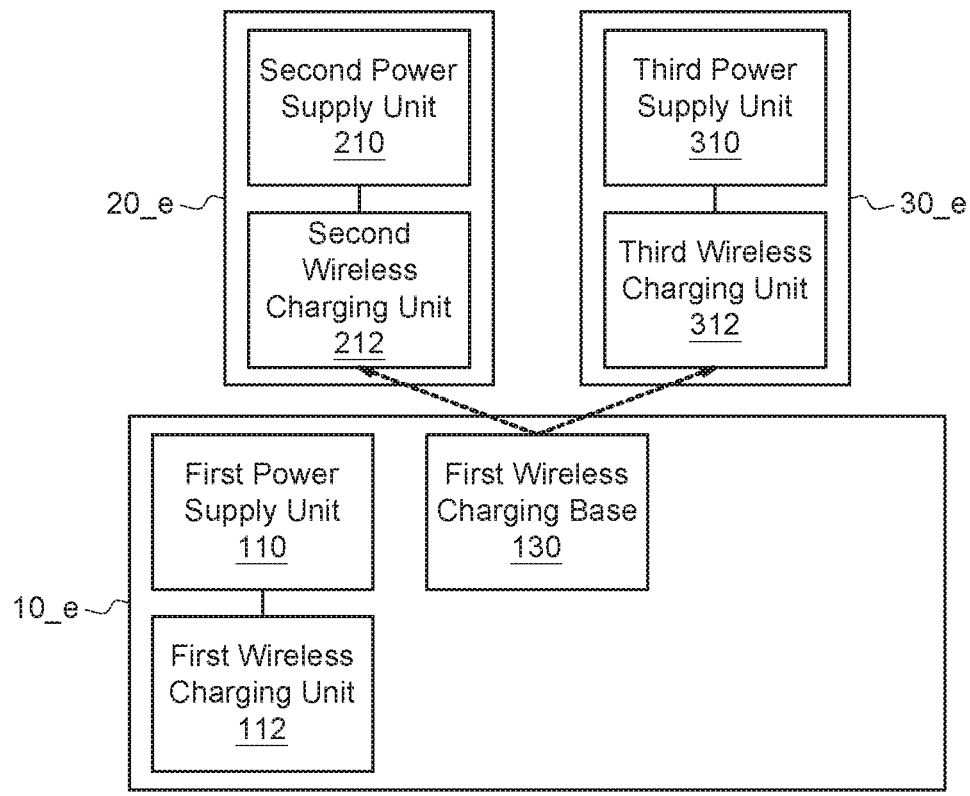
FIG. 8A shows a diagram illustrating integrated wireless charging of three self-propelled speaker devices according to an embodiment of the disclosure.

Similar to the embodiment shown in FIG. 6A and FIG. 6B, the first self-propelled speaker device 10, the second self-propelled speaker device 20, and the third self-propelled speaker device 30 may be integrated to perform wireless charging. FIG. 8A shows a diagram illustrating integrated wireless charging of three self-propelled speaker devices according to an embodiment of the disclosure. The first wireless charging unit 112 is inductively coupled to an external charger to charge the first power supply unit 110. The first self-propelled speaker device 10_e includes the first wireless charging base 130. The second wireless charging unit 212 is inductively coupled to the first wireless charging base 130 to charge the second power supply unit 210. The third wireless charging unit 312 is inductively coupled to the first wireless charging base 130 to charge the third power supply unit 310. For example, the second wireless charging unit 212 and the third wireless charging unit 312 may stick to the first wireless charging base 130 by the magnetic force.

Figure 8B:
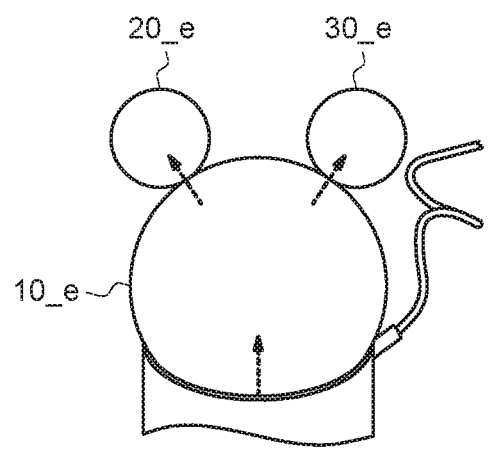
FIG. 8B shows a diagram illustrating an appearance of integrated wireless charging of three self-propelled speaker devices according to an embodiment of the disclosure.

FIG. 8B shows a diagram illustrating an appearance of integrated wireless charging of three self-propelled speaker devices according to an embodiment of the disclosure. Spherical casings are used in this embodiment, and the first self-propelled speaker device 10 has a larger casing than the other two self-propelled speaker devices. When performing wireless charging, the first self-propelled speaker device 10_e may be put above the external charger base, the second self-propelled speaker device 20_e may be put above the first self-propelled speaker device 10_e (fixed there by the magnetic force), and the third self-propelled speaker device 30_e may also be put above the first self-propelled speaker device 10_e (fixed there by the magnetic force). Only one external charger base is required for integrated wireless charging of three self-propelled speaker devices, hence improving the usage convenience.

The second self-propelled speaker device 20 and the third self-propelled speaker device 30 shown in FIG. 5 and FIG. 7 may also include an environmental detection unit (detecting the surrounding geographical environment), a user control interface (enabling manual mode for movement control), and a light display unit (changing lights according to the music played), just like the embodiment shown in FIG. 4. The operation details of these units may be referred to the first self-propelled speaker device 10_c in FIG. 4 and are not repeater here. In one embodiment, the wireless speaker system 1 may include more than three self-propelled speaker devices to accomplish a more complete surround stereo effect. The elements and operations of each self-propelled speaker device may be similar to the embodiments described above (such as being capable of tracking the mobile device M1, being integrated for wireless charging) and thus are not repeated here.

Figure 9:
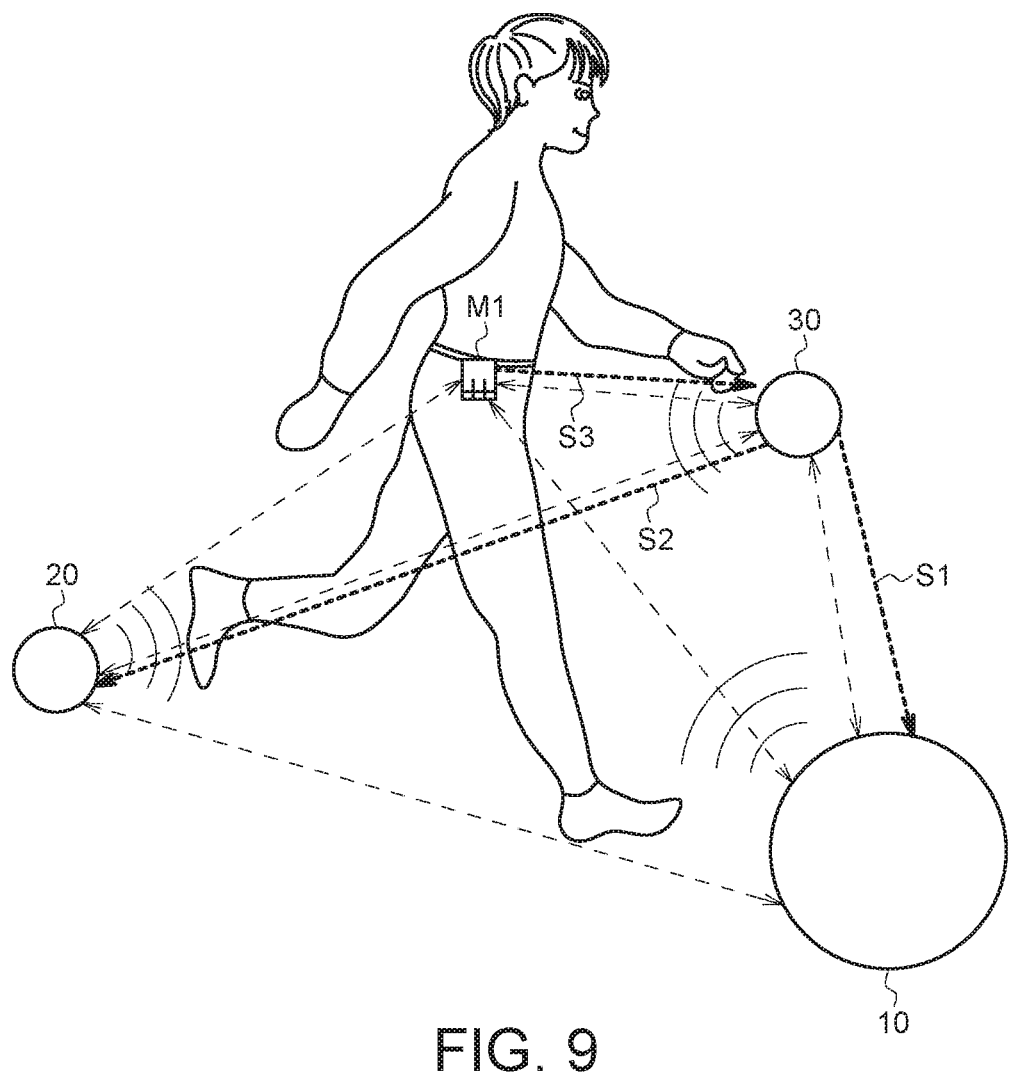
FIG. 9 shows a diagram illustrating a wireless speaker system in use according to an embodiment of the disclosure.

FIG. 9 shows a diagram illustrating a wireless speaker system in use according to an embodiment of the disclosure. In the scenario shown here, the user carries a mobile device M1 (a cellphone for example). The wireless speaker system 1 includes the first self-propelled speaker device 10, the second self-propelled speaker device 20, and the third self-propelled speaker device 30, which may act as a bass channel speaker, a right channel speaker, and a left channel speaker, respectively. The third self-propelled speaker device 30 receives the third audio signal S3 from the mobile device M1, which may be a song chosen by the user. The third self-propelled speaker device 30 then transmits the first audio signal S1 to the first self-propelled speaker device 10 and transmits the second audio signal S2 to the second self-propelled speaker device 20. All the first self-propelled speaker device 10, the second self-propelled speaker device 20, and the third self-propelled speaker device 30 track the location of the mobile device M1, and also track the locations of each other (tracking signals are shown in thin dashed lines in FIG. 9). Therefore, the wireless speaker system 1 can move along with the user and can also produce good stereophonic sound effect.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wireless speaker system, comprising:
   a first self-propelled speaker device, comprising:
      a first processing unit;
      a first wireless audio transmitter/receiver unit, coupled to the first processing unit, configured to receive a first audio signal via a wireless transmission interface;
      a first speaker unit, coupled to the first processing unit, configured to produce sound according to the first audio signal;
      a first tracking unit, coupled to the first processing unit, configured to track a location of a mobile device; and
      a first actuator, coupled to the first processing unit, wherein the first processing unit controls the first actuator according to the location of the mobile device, and the first actuator drives the first self-propelled speaker device to move along with the mobile device.

2. The wireless speaker system according to claim 1, wherein the first self-propelled speaker device further comprises:
   a first power supply unit, configured to supply power to the first self-propelled speaker device; and
   a first wireless charging unit, coupled to the first power supply unit, and inductively coupled to an external charger to charge the first power supply unit.

3. The wireless speaker system according to claim 1, wherein the first self-propelled speaker device further comprises:
   a first environment detection unit, coupled to the first processing unit, configured to detect a geographical environment surrounding the first self-propelled speaker device, wherein the first processing unit controls the first actuator according to the geographical environment surrounding the first self-propelled speaker device.

4. The wireless speaker system according to claim 1, wherein the first self-propelled speaker device further comprises:
a first user control interface, coupled to the first processing unit, configured to receive a control command, wherein the first processing unit controls the first actuator according to the control command, and the first actuator drives the first self-propelled speaker device to move according to the control command.

5. The wireless speaker system according to claim 1, wherein the first self-propelled speaker device further comprises:
a first light display unit, coupled to the first processing unit, the first light display unit comprising a lighting device, wherein the first processing unit is configured to analyze the first audio signal to obtain first audio characteristic data, and the first light display unit is configured to adjust color and/or light intensity of the lighting device according to the first audio characteristic data.

6. The wireless speaker system according to claim 1, wherein the first actuator comprises at least one of a motor, a wheel, a continuous track, a propeller, and a paddle wheel.

7. The wireless speaker system according to claim 1, further comprises:
a second self-propelled speaker device, comprising:
a second processing unit;
a second wireless audio transmitter/receiver unit, coupled to the second processing unit, configured to receive a second audio signal via the wireless transmission interface;
a second speaker unit, coupled to the second processing unit, configured to produce sound according to the second audio signal;
a second tracking unit, coupled to the second processing unit, configured to track the location of the mobile device; and
a second actuator, coupled to the second processing unit, wherein the second processing unit controls the second actuator according to the location of the mobile device, and the second actuator drives the second self-propelled speaker device to move along with the mobile device.

8. The wireless speaker system according to claim 7, wherein the first tracking unit is further configured to track a location of the second self-propelled speaker device, the first processing unit is further configured to control the first actuator according to the location of the second self-propelled speaker device, the second tracking unit is further configured to track a location of the first self-propelled speaker device, and the second processing unit is further configured to control the second actuator according to the location of the first self-propelled speaker device.

9. The wireless speaker system according to claim 7, wherein the first self-propelled speaker device further comprises:
a first power supply unit, configured to supply power to the first self-propelled speaker device;
a first wireless charging unit, coupled to the first power supply unit, and inductively coupled to an external charger to charge the first power supply unit; and
a first wireless charging base;

wherein the second self-propelled device further comprises:
a second power supply unit, configured to supply power to the second self-propelled speaker device; and
a second wireless charging unit, coupled to the second power supply unit, and inductively coupled to the first wireless charging base to charge the second power supply unit.

10. The wireless speaker system according to claim 7, further comprises:
a third self-propelled speaker device, comprising:
a third processing unit;
a third wireless audio transmitter/receiver unit, coupled to the third processing unit, configured to receive a third audio signal via the wireless transmission interface;
a third speaker unit, coupled to the third processing unit, configured to produce sound according to the third audio signal;
a third tracking unit, coupled to the third processing unit, configured to track the location of the mobile device; and
a third actuator, coupled to the third processing unit, wherein the third processing unit controls the third actuator according to the location of the mobile device, and the third actuator drives the third self-propelled speaker device to move along with the mobile device.

11. The wireless speaker system according to claim 10, wherein the first self-propelled speaker device, the second self-propelled speaker device, and the third self-propelled speaker device track locations of each other by the first tracking unit, the second tracking unit, and the third tracking unit, respectively, and the first processing unit, the second processing unit, and the third processing unit accordingly control the first actuator, the second actuator, and the third actuator, respectively.

12. The wireless speaker system according to claim 10, wherein
the first self-propelled speaker device further comprises:
a first power supply unit, configured to supply power to the first self-propelled speaker device;
a first wireless charging unit, coupled to the first power supply unit, and inductively coupled to an external charger to charge the first power supply unit; and
a first wireless charging base;
the second self-propelled device further comprises:
a second power supply unit, configured to supply power to the second self-propelled speaker device; and
a second wireless charging unit, coupled to the second power supply unit, and inductively coupled to the first wireless charging base to charge the second power supply unit;
the third self-propelled device further comprises:
a third power supply unit, configured to supply power to the third self-propelled speaker device; and
a third wireless charging unit, coupled to the third power supply unit, and inductively coupled to the first wireless charging base to charge the third power supply unit.

13. The wireless speaker system according to claim 10, wherein the first speaker unit is a bass channel speaker, the second speaker unit is a right channel speaker, and the third speaker unit is a left channel speaker.

14. The wireless speaker system according to claim 10, wherein the first wireless audio transmitter/receiver unit receives the first audio signal from the third self-propelled speaker device, the second wireless audio transmitter/receiver unit receives the second audio signal from the third self-propelled speaker device, and the third wireless audio transmitter/receiver unit receives the third audio signal from the mobile device.

\* \* \* \* \*